US005398257A

United States Patent [19]

Groenteman

[11] Patent Number: 5,398,257

[45] Date of Patent: Mar. 14, 1995

[54] COPIER AND MONITORING NETWORK

[76] Inventor: Frank S. Groenteman, 3304 Cornell Ave., Dallas, Tex. 75205

[21] Appl. No.: 2,890

[22] Filed: Jan. 11, 1993

[51] Int. Cl.[6] .................... G06F 3/00

[52] U.S. Cl. .................... 375/200; 355/704; 355/207

[58] Field of Search .................... 375/1; 355/308, 202-204; 380/34

[56] References Cited

U.S. PATENT DOCUMENTS

| | | | |
|---|---|---|---|
| 4,167,322 | 9/1979 | Yano et al. | 355/204 |
| 4,497,037 | 1/1985 | Kato et al. | 355/202 |
| 4,583,834 | 4/1986 | Seko et al. | 355/206 |
| 4,965,676 | 10/1990 | Ejiri et al. | 358/406 |
| 4,975,926 | 12/1990 | Knapp | 375/1 |
| 4,999,672 | 3/1991 | Rice, Jr. et al. | 355/202 |
| 5,005,183 | 4/1991 | Carey et al. | 375/1 |
| 5,016,059 | 5/1991 | Smeiman | 355/308 |
| 5,046,066 | 9/1991 | Messenger | 375/1 |
| 5,057,866 | 10/1991 | Hill, Jr. et al. | 355/200 |
| 5,077,582 | 12/1991 | Kravette et al. | 355/206 |
| 5,084,875 | 1/1992 | Weinberger et al. | 371/291 |
| 5,164,767 | 11/1992 | Suzuki | 355/209 |
| 5,214,772 | 5/1993 | Weinberger et al. | 355/204 |
| 5,220,380 | 6/1993 | Hirata et al. | 355/204 |
| 5,231,646 | 7/1993 | Heath et al. | 375/1 |
| 5,282,127 | 1/1994 | Mii | 355/206 |
| 5,293,196 | 3/1994 | Kaneko et al. | 355/206 |
| 5,333,286 | 6/1994 | Weinberger et al. | 355/204 |

*Primary Examiner*—Salvatore Cangialosi
*Attorney, Agent, or Firm*—Baker & Botts

[57] ABSTRACT

A copying machine (10) includes copying circuitry (14) controlled by a copier processor (12). The copier processor (12) gathers and generates status information for the copying machine (10) and this status information is transmitted to a remote processor by a wireless transceiver (18). A transceiver processor (16) may be used to analyze the status information and control operation of the wireless transceiver (18). The wireless transceiver (18) may also receive information and corrective action in response to the transmitted status information for use by the copier processor (12) in controlling operation of the copying circuitry (14). A monitoring network can be formed using a plurality of copying machines (10) that send status information to a base processor (22) through a base transceiver (24). The base processor (22) can initiate appropriate action in response to received status information. A store and forward repeater (26) may be used to allow the base processor (22) to communicate with copying machines out of range of the wireless transceiver operational area.

17 Claims, 1 Drawing Sheet

COPIER AND MONITORING NETWORK

TECHNICAL FIELD OF THE INVENTION

The present invention relates in general to paper processing devices and more particularly to a copier and monitoring network.

BACKGROUND OF THE INVENTION

Paper processing devices such as copy machines and photocopiers are well known in the art. These copying machines generate status information such as copy count, malfunction indications, toner indications, paper jam warnings, and adjustment requirements. Many devices exist that monitor status information from copying machines, usually through direct connection to a computer or by connection to a remote computer through telephone line communication. However, these devices are not economically justifiable for the copier industry because of the high cost of telephone line installation, monthly telephone line service costs, and lack of copying machine portability. Therefore, it is desirable to have a system that monitors copying machine status information without direct connection to local or remote processors.

From the foregoing, it may be appreciated that a need has arisen for a copier that does not require hardwire or telephone line installation for the monitoring of status information. A need has also arisen for a copier that can communicate status information and receive corrective adjustments through wireless communications. Further, a need has arisen for a copier monitoring network for monitoring the status information of a plurality of copying machines from a centralized remote location.

SUMMARY OF THE INVENTION

In accordance with the present invention, a copier and monitoring network are provided which substantially eliminate or reduce disadvantages and problems associated with conventional copying machines and monitoring systems.

The present invention includes a copier that determines and generates status information through a copier processor. A wireless transceiver transmits the status information and receives information that is related to the copier processor to control operation of the copier. A transceiver processor may also be used to analyze the status information and control operation of the wireless transceiver in response to the status information. A network may be formed by having a plurality of these copiers transmit status information to a remote base processor for the monitoring of copying machine activity.

The copier and monitoring network of the present invention provide for various technical advantages. For example, one technical advantage is in avoiding the use of hardwire or telephone line installation for the monitoring of copying machine status information. Another technical advantage is to have a copying machine that implements a wireless transceiver for the transmission of status information. Yet another technical advantage is in having a monitoring network that receives copying machine status information at a centralized base processor without physically connecting the base processor to a multitude of copying machines. Other technical advantages are readily apparent to one skilled in the art from the following descriptions, figures, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
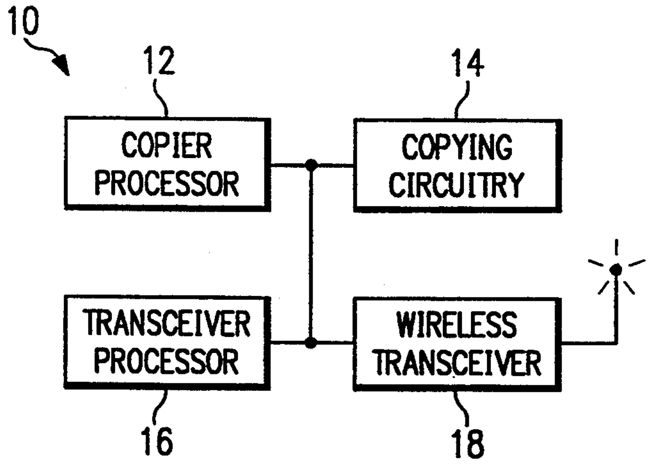
FIG. 1 illustrates a block diagram of a copying machine.

FIG. 1 is a block diagram of a copying machine 10. Copying machine 10 includes a copier processor 12 coupled to a copying circuitry 14. Copier processor 12 also couples to a transceiver processor 16 and a transceiver 18. Copying machine 10 operates in generally the same fashion as that disclosed in U.S. Pat. No. 5,077,582 issued Dec. 31, 1991 to Kravette, et al. and U.S. Pat. No. 5,084,875 issued Jan. 28, 1992 to Weinberger, et al., which are incorporated herein by reference.

The present invention is dissimilar to the two patents referenced above in that status information gathered and generated by copier processor 12 regarding the operation of copier circuitry 14 is transmitted by wireless transceiver 18 to a remote processor instead of through a modem and telephone line connection. Wireless transceiver 18 is preferably a two-way radio frequency spread spectrum communication device. Wireless transceiver 18 divides the radio frequency spread spectrum operating band, 900 to 928 MHz, into 20 subchannels and selects the quietest subchannel for use for each transmission. No FCC license is required with such a transceiver, thus enhancing the hands off monitoring capability for copying machine 10. Wireless transceiver 18 may also receive corrective adjustments from a remote transceiver to control the operation of copying machine 10 without any manual involvement.

Wireless transceiver 18 may interface with copying machine 10 by connecting directly to copier processor 12 and any sensors or information ports within copying circuitry 14 for the transmission of status information. However, transceiver processor 16 may be used to analyze status information and determine if a signal should be sent through wireless transceiver 18. Transceiver processor 16 may be programmed to react in specific manners according to the analysis of the status information by controlling wireless transceiver 18 in response to the analyzed status information. Transceiver processor 16 may also be used to process the status information into an appropriate code for transmission that includes information uniquely identifying copying machine 10.

Figure 2:
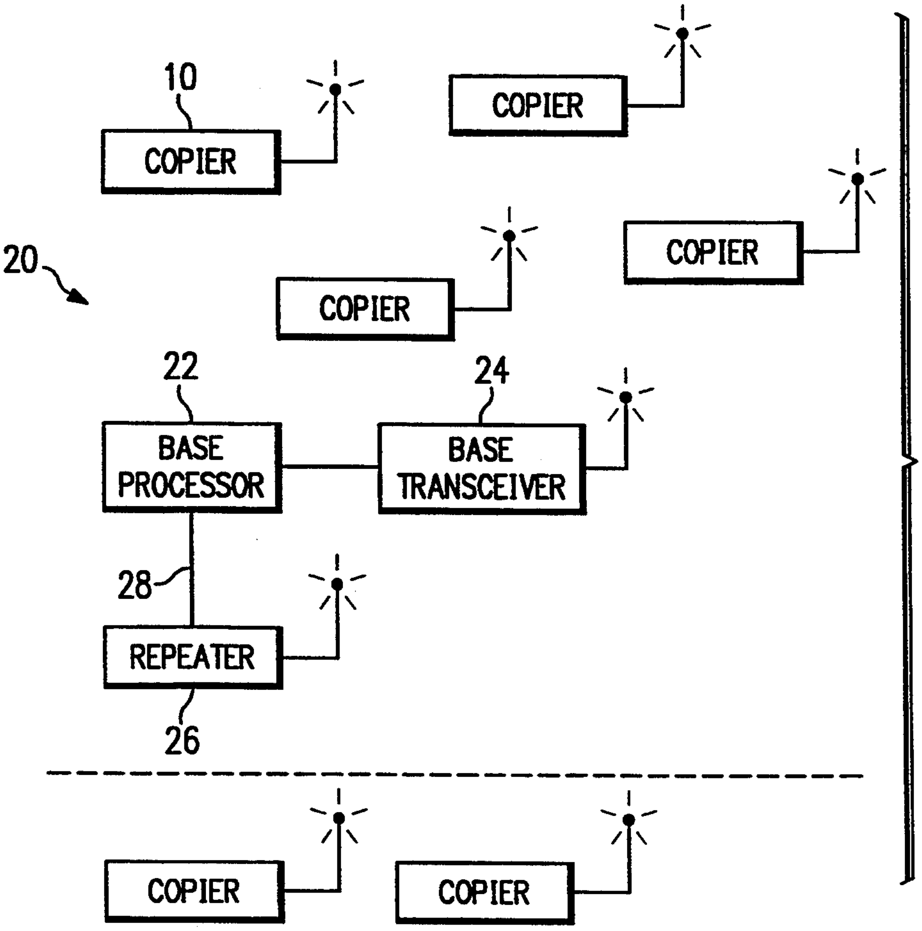
FIG. 2 illustrates a block diagram of a monitoring network for a plurality of copying machines.

FIG. 2 is a block diagram of a copier monitoring network 20. Copier monitoring network 20 includes a plurality of copying machines 10, each having a wireless transceiver for communicating status information to a base processor 22 through a base transceiver 24. Base processor 22 analyzes the status information to determine whether corrective adjustments can be transmitted directly to a copying machine 10 through wireless transceivers. In this manner, base processor 22 located at a centralized remote location can effectively monitor copying machine status information for a plurality of copying machines and respond quickly without any manual intervention. Base processor 22 can generate a historical file for each copying machine in order to track individual copying machine performance. Base processor 22 responds to received status information by communicating appropriate corrective action through the wireless transceivers back to the appropriate copying machine, by contacting the owners of each copying machine, by dispatching service personnel, or by providing billing information corresponding to each copying machine.

Wireless transceivers within each copying machine have a distance restriction because of frequency and power limitations controlled by the FCC. This distance restriction is typically within a 50 mile radius of the wireless transceiver. A store and forward repeater 26 can be used to extend the transmission distances of the wireless transceivers. Store and forward repeater 26 includes a microprocessor and wireless transceiver similarly found in each copying machine for picking up signals from out of range copying machines and relaying these signals to base processor 22 either by wireless transmission through base transceiver 24 or through converting the signals to allow for telephone line transmission over line 28.

Though not shown, remote antennas may be used to improve the transmission distances of the wireless transceivers. Store and forward repeater 26 may also relay information between copying machines and base processor 22 through long range radio frequency communications, microwave, satellite, or other types of long range communication techniques.

In summary, a copying machine can transmit status information through wireless communication techniques to a remote processor and receive corrective action and other information from the remote processor in response to transmitted status information. The copying machine may be one of many copying machines within a monitoring network controlled by a base processor.

Thus, it is apparent that there has been provided, in accordance with the present invention, a copier and monitoring system that satisfies the advantages set forth above. Although the preferred embodiment has been described in detail, it should be understood that various changes, substitutions, and alterations can be made herein without departing from the spirit and scope of the invention as defined by the following claims.

What is claimed is:

1. A device for making photocopies, comprising:

a copier processor for gathering and generating status information regarding operation of the device;

a wireless radio frequency spread spectrum transceiver for transmitting said status information over a wide geographic area and for receiving diagnostic control information sent from said wide geographic area to control operation and provide corrective adjustments for the device through said copier processor, said wide geographic area including a radius of fifty miles from said wireless radio frequency transceiver.

2. The device of claim 1, further comprising:

a transceiver processor for analyzing said status information to determine whether said status information is to be sent by said wireless radio frequency transceiver.

3. The device of claim 2, wherein said transceiver processor converts said status information into a code for transmission by said wireless transceiver, said code uniquely identifying the device.

4. A copier monitoring network, comprising:

a wireless base spread spectrum transceiver for receiving status information sent from within a wide geographic area and transmitting diagnostic control information within said wide geographic area in response to said status information;

a base processor coupled to said wireless base transceiver for analyzing said status information and generating said diagnostic control information for said wireless base transceiver in response to said status information;

a plurality of copying machines within said wide geographic area, each copying machine including a copier processor for gathering and generating said status information regarding operation of a corresponding copying machine, each copying machine including a wireless copier spread spectrum transceiver for transmitting said status information to and receiving said diagnostic control information from said wireless base transceiver, said base processor and said wireless base transceiver being at a geographically remote location from each copying machine within said wide geographic area, said wide geographic area including a radius of fifty miles from said wireless base transceiver.

5. The network of claim 4, wherein each copying machine includes a transceiver processor for analyzing said status information to determine whether said status information is to be sent by said wireless copier transceiver.

6. The network of claim 5, wherein each transceiver processor converts status information from a copying machine associated therewith into a separate code for transmission by a corresponding wireless copier transceiver, said code including information to uniquely identify said copying machine associated therewith.

7. The network of claim 4, further comprising:

a store and forward repeater within said wide geographic area for relaying said status information and said diagnostic control information between said wireless base transceiver and a copying machine located outside said wide geographic area.

8. The network of claim 7, wherein each store and forward repeater includes a wireless relay transceiver and a relay processor for controlling said wireless relay transceiver.

9. The network of claim 8, wherein said store and forward repeater connects directly to said base processor by wire communications.

10. A method of monitoring a copying machine, comprising the steps of:

generating status information within the copying machine regarding operation of the copying machine;

receiving said status information from the copying machine through wireless spread spectrum radio frequency communications transmitted over a wide geographic area, the wide geographic area including a radius of fifty miles from the copying machine.

11. The method of claim 10, further comprising the step of:

initiating appropriate corrective action in response to said status information.

12. The method of claim 11, further comprising the step of:

analyzing said status information to determine whether said status information should be transmitted from the copying machine.

13. The method of claim 12, wherein said initiating step includes transmitting diagnostic control information to the copying machine by wireless communication from a geographically remote location in order to perform said corrective action.

14. The device of claim 1, wherein said wide geographic area includes a radius of 50 miles from said wireless radio frequency transceiver.

15. The device of claim 1, wherein said status information includes malfunction indications, toner indications, paper jam warnings, and adjustment requirements.

16. The device of claim 4, wherein said wide geographic area includes a radius of 50 miles from said wireless base transceiver.

17. The device of claim 4, wherein said wireless copier transceiver transmits said status information without receiving requests from said wireless base transceiver.

* * * * *